United States Patent [19]

Leicht

[11] 4,447,062

[45] May 8, 1984

[54] SEALING ARRANGEMENT FOR FLUID FLOW ENGINES

[75] Inventor: Werner Leicht, Stetten, Fed. Rep. of Germany

[73] Assignee: MTU-Motoren-und-Turbinen-Union Friedrichschafen GmbH, Friedrichshafen, Fed. Rep. of Germany

[21] Appl. No.: 451,814

[22] Filed: Dec. 21, 1982

[30] Foreign Application Priority Data

May 21, 1982 [DE] Fed. Rep. of Germany ....... 3219127

[51] Int. Cl.³ ............................................. F16J 15/14
[52] U.S. Cl. ........................................ 277/3; 277/29; 277/59; 277/DIG. 8
[58] Field of Search .................. 277/3, 29, 59, DIG. 8

[56] References Cited

U.S. PATENT DOCUMENTS

| | | | |
|---|---|---|---|
| 1,867,236 | 7/1932 | Van Rijswijk | 277/3 |
| 2,307,755 | 1/1943 | Beckwith | 277/59 |
| 2,595,592 | 5/1952 | Magnuson | 277/59 |
| 3,100,648 | 8/1963 | Lee et al. | 277/DIG. 8 |
| 3,901,434 | 8/1975 | Wright | 277/29 |
| 3,917,288 | 11/1975 | Hüber | 277/59 |
| 4,189,156 | 2/1980 | Geary et al. | 277/3 |

Primary Examiner—Robert I. Smith
Attorney, Agent, or Firm—Craig & Burns

[57] ABSTRACT

A sealing arrangement between the shaft and housing of a fluid flow engine with a blocking gas space limited by piston rings; the blocking gas pressure is controlled by changing the effective cross section of venting bores and therewith is matched to the gas pressure to be sealed off; the change of the cross section of the venting bores is thereby automatically realized by axial displacement of the corresponding piston ring as a function of the gas, respectively, blocking gas pressure acting on the same. An axial wear at the piston ring and at the groove flank, which is present during the running-in period, is avoided subsequent thereto as a result of the decrease of the blocking gas pressure.

7 Claims, 1 Drawing Figure

U.S. Patent
May 8, 1984
4,447,062
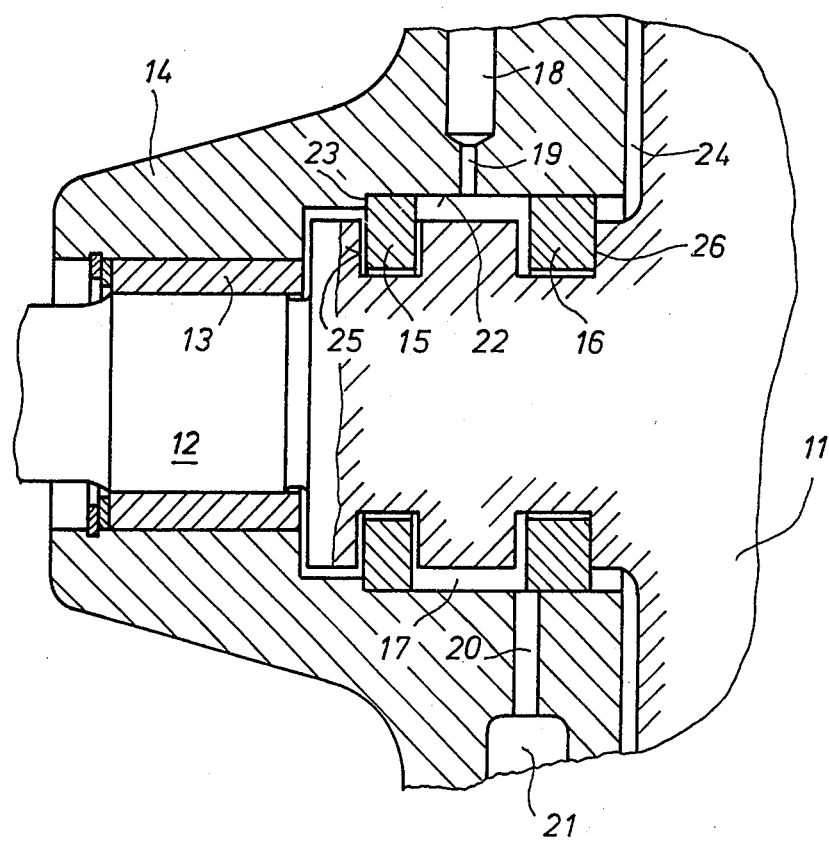

SEALING ARRANGEMENT FOR FLUID FLOW ENGINES

The present invention relates to a sealing arrangement for fluid flow engines with two seals arranged adjacent one another, of which at least one seal is constructed as piston ring seal, whereby the space formed between the two seals is acted upon or filled with a blocking gas and can be relieved by way of venting bores having a controllable cross section.

Such types of seals are intended to prevent the loss of lubricant from the bearing places of the fluid flow engine and the penetration of hot gases into the bearing places.

In order to maintain the seal in a functionally capable manner under all operating conditions with strongly changing gas pressures, it is known from the German Gebrauchsmuster No. 16 29 297 to adjust the pressure in the space between the piston rings acted upon with blocking gas by means of venting bores having a controllable cross section in such a manner that approximately pressure equality prevails on both sides of a piston ring and therewith a leakage is far-reachingly avoided.

Disadvantageous with this prior art construction is thereby the cost for the arrangement for changing the cross section of the venting bores as well as for the control device which has to adjust the size of the venting cross section and therewith the magnitude of the blocking gas pressure in dependence on the operating condition.

It is the aim of the present invention to indicate a simple arrangement for changing the venting bore cross section.

The underlying problems are solved in accordance with the present invention in that the orifices of the venting bores in the blocking gas space are covered off by a piston ring and the cross section of the vent bores which is effective for the relief of the blocking gas space, can be changed by axial movement of the piston ring.

A simple closure mechanism for the venting bores which can be manufactured in a simple manner and without great additional expenditures, can be realized by these features of the present invention. The cross-sectional change is realized in dependence on the prevailing pressures in such a manner that a control mechanism can be dispensed with therefor. Since approximately pressure equality will thereby adjust itself under every operating condition on both sides of the piston ring, the wear between piston ring and groove flanks of the shaft groove is limited and a reliable seal is attained.

During the manufacture, large tolerances can be permitted for the position of the venting bores in the housing, respectively, of the grooves in the shaft in that the axial movement of the piston ring for changing the relief cross section is made possible by wear at the abutment surfaces of piston ring and groove flank and is terminated by the pressure equalization on both sides of the piston ring which establishes itself.

These and further objects, features and advantages of the present invention will become more apparent from the following description when taken in connection with the accompanying drawing which shows, for purposes of illustration only, one embodiment in accordance with the present invention, and wherein:

The single FIGURE is a partial longitudinal cross-sectional view through an exhaust gas turbocharger equipped with a sealing arrangement in accordance with the present invention.

Referring now to the single FIGURE of the drawing, a turbine wheel 11 is securely connected with the shaft 12 of the exhaust gas turbocharger. The shaft 12 is supported with respect to a housing 14 in bearings 13. A sealing arrangement consisting of the piston rings 15 and 16 is arranged at the place where the shaft 12 extends through the housing 14. A blocking gas space 17 is present between the piston rings 15 and 16, which is supplied with blocking gas by way of a line 18 and a throttle 19, for example, from the compressor side. Vent bores 20 lead from the blocking gas space 17 into a space 21 which is connected with the atmosphere.

The piston rings 15 and 16 are axially guided in grooves of the shaft 12. They are clamped-in radially in a bore 22 of the housing 14 and, as a result thereof, are not taken along during rotation of the shaft 12.

In order to prevent that exhaust gas penetrates from the turbine side by way of a gap 24 and past the piston rings 15 and 16 into the bearing places 13, a blocking gas pressure is required in the blocking gas space which is higher compared to the exhaust gas pressure. This blocking gas pressure acts on the two piston rings 15 and 16 and seeks to axially displace the piston ring 15 toward the bearing 13 and the piston ring 16 toward the turbine wheel 11.

In order to prevent a wear caused thereby between the stationary piston ring 15 and the corresponding shaft groove flank 25, the piston ring 15 is supported by a shoulder 23 in the bore 22 of the housing 14.

The axial thrust acting on the piston ring 16 and caused by the blocking gas pressure is partially equalized by the oppositely acting axial thrust caused by the exhaust gas pressure. However, operating conditions may occur in which the exhaust gas pressure is strongly reduced or is no longer present at all (for example, with a turned-off exhaust gas turbocharger), whereas the blocking gas pressure continues to remain effective.

Theoretically, the piston ring 16 could now also be supported in the blocking gas space 17 against the blocking gas pressure by means of a corresponding shoulder in the bore 22. This, however, entails constructive difficulties and aggravations during the assembly and disassembly of the exhaust gas turbocharger.

In order to increase the resistance of the piston ring against an axial displacement, a larger piston ring width was therefore selected and therewith an increased radial abutment force in the bore 22 was achieved for this piston ring. Therebeyond, this greater width permits also a greater permissive axial wear of the piston ring.

The piston ring 16 is initially so arranged that it covers off the orifice of the venting bores 20 in the blocking gas space 17. As a result thereof, a high blocking gas pressure builds up in the blocking gas space 17, which exceed the gas pressure on the turbine side in the gap 24 and therewith prevents a penetration of exhaust gases into the bearing 13.

If the exhaust gas pressure now decreases, as described, then the piston ring 16 is forced against the flank 26 of its shaft groove, if the axial force acting on the piston ring 16 and caused by the blocking gas pressure overcomes the friction in the bore 22 produced by the radial abutment force of the piston ring. As a result of the wear at the piston ring 16 and/or groove flank 26 which results thereby, the piston ring moves axially in the direction of the turbine wheel. The venting bores 20 are thereby increasingly controlled to open up which has, as a consequence, a decrease of the blocking gas pressure until finally the wear is stopped.

If, during the reoccurrence of exhaust gas pressure, the latter should lie considerably above the adjusted blocking gas pressure, then the piston ring 16 is again displaced away from the turbine wheel 11 for such length of time until the blocking gas pressure increases by closing off the venting bores up to the approximate equilibrium with respect to the exhaust gas pressure.

As a result of the approximate pressure equalization on both sides of the piston ring which establishes itself automatically under all operating conditions, a reliable seal is achieved and any further wear is avoided after the runing-in.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A sealing arrangement for fluid flow engines having two seal means arranged adjacent one another, at least one of said seal means being constructed as piston ring seal, the space formed between the two seal means being operable to be filled with a blocking gas and to be vented by way of vent bore means with adjustable cross section, characterized in that the orifice of the vent bore means in the blocking gas space is operable to be substantially covered off by the piston ring and in that the cross section of the vent bore means effective for the relief of the blocking gas space can be changed by axial movement of the piston ring.

2. A sealing arrangement according to claim 1 in which a groove flank in the part accommodating the piston ring limits axial movement thereof, characterized in that the axial movement of the piston ring for changing said cross section is made possible by wear at abutment surfaces of the piston ring and of the groove flank and in that the axial movement is terminated by pressure equalization on both sides of the piston ring which will establish itself.

3. A sealing arrangement according to claim 1, wherein the fluid flow engine includes a shaft, bearing means supporting said shaft in a housing on one side of one of said seal means, said shaft being exposed to hot gases on the other side of the other seal means, and said seal means together with the pressure in the gas blocking space preventing the penetration of the hot gases into said bearing means.

4. A sealing arrangement according to claim 3, wherein said piston ring is accommodated in a groove in said shaft, the axial movement of said piston ring in said groove in the direction toward said hot gases being limited by a groove flank, and the extent of axial movement of said piston ring in said last-mentioned direction being automatically limited by wear between said piston ring and said groove flank.

5. A sealing arrangement according to claim 4, wherein the wear between said piston ring and said groove flank is terminated when the opening of vent bore means as a result of such wear has reached a predetermined cross section.

6. A sealing arrangemet according to claim 5, wherein both seal means are constructed as piston rings.

7. A sealing arrangement according to claim 1, wherein both seal means are constructed as piston rings.

* * * * *